United States Patent [19]

Cytanovich

[11] Patent Number: 5,057,020

[45] Date of Patent: Oct. 15, 1991

[54] READING ENABLER

[76] Inventor: Kathryn F. Cytanovich, 161 California Ave., Palo Alto, Calif. 94306

[21] Appl. No.: 852,193

[22] Filed: Apr. 15, 1986

[51] Int. Cl.⁵ .............................................. G09B 19/04
[52] U.S. Cl. .................................... 434/178; 434/312
[58] Field of Search ..................... 434/178, 312, 313

[56] References Cited

U.S. PATENT DOCUMENTS 4,007,548  2/1977  Cytanovich ..................... 434/178
4,151,659  5/1979  Lien et al. ....................... 434/178
4,609,357  9/1986  Clegg ............................... 434/178

Primary Examiner—Edward M. Coven
Attorney, Agent, or Firm—John P. Sutton

[57] ABSTRACT

A reading machine and a method of teaching reading are disclosed in which a source of information to be read by a student learning how to read is scanned and entered into a memory. The words from the source are augmented with symbols and numbers to facilitate learning how to speak each sound of each syllable in the correct sequence.

7 Claims, 1 Drawing Sheet

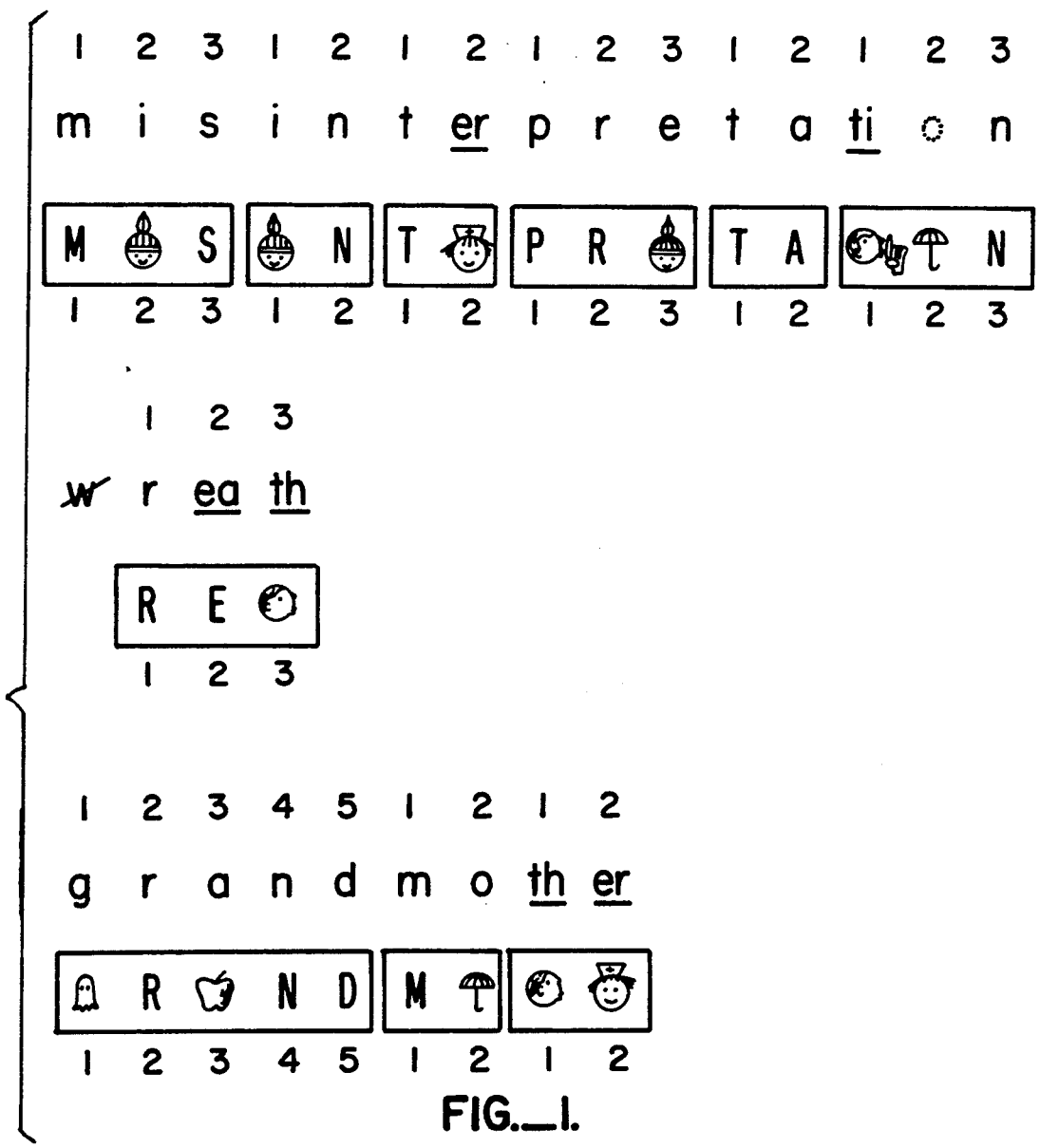
FIG._1.
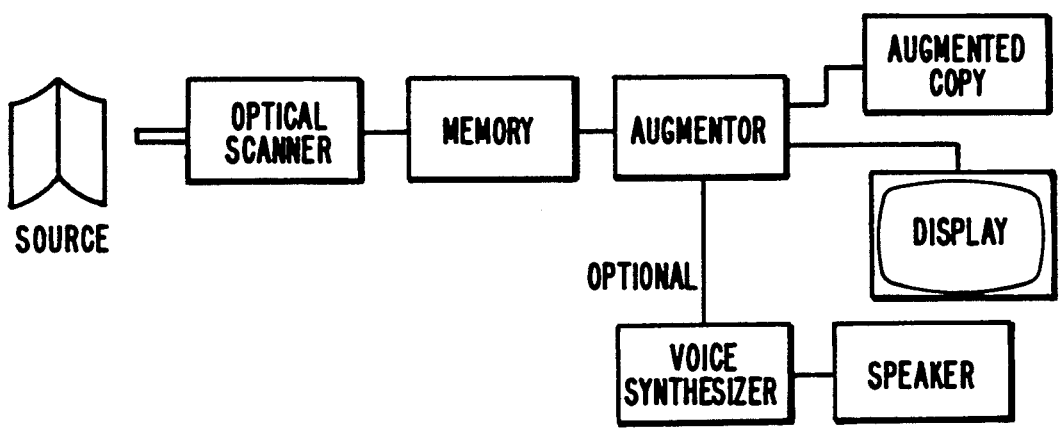
FIG._2.

READING ENABLER

BACKGROUND OF THE INVENTION

In my prior patent, U.S. Pat. No. 4,007,548, I described and claimed a method of augmenting printed word symbols and numbers to provide a rapid and effective way to teach reading. The augmenting of words was done manually and resulted in a labor-intensive process. Every word that a student has difficulty reading must be displayed in the augmented orthography. For beginning readers, this means every word, but even advanced readers benefit from the augmented presentation for those words they have difficulty with. The method provides the student with a strategy for recognizing words in their correct spelling. The words are augmented with visual and phonological aids which enable the reader to quickly process the word. The system is a tool for unlocking new words. 9000 word cards to teach word recognition were developed. The augmenting of these words was done manually and resulted in a labor intensive process. Because of the time consuming process it was impossible to translate or augment a meaningful amount of text material.

Research and experience with the symbols and numbers systems show that students gradually become fluent in reading ordinary (non-augmented) text, because along with word recognition skills, the system teaches grouping, tracking, phonics and word analysis skills.

To use this system more effectively with students in grades 1-12, materials in the content area such as textbooks augmented with symbols and numbers are needed. Students would then be able to keep up with their school work while gaining fluency in standard reading materials. The coded materials would provide a kind of intermediate Braille for the functionally illiterate and/or learning disabled student.

There is a need for a machine to generate the necessary reading materials so that the beginning readers, functional illiterates, and dyslexics can not only learn to read but also keep up in school or trade while they learn and build their skills and confidence.

To attempt to generate the necessary materials without a machine would be so labor and time intensive that it would not be practical.

SUMMARY OF THE INVENTION

The present invention permits the use of machines to generate materials to assist students to read more effectively and more easily than traditional reading techniques. A source of information to be read, such as a book, is inserted into memory by an optical scanner. A computer augments the words to be read with numbers and symbols to make them more easily read and generates the books in hard copy. Basically, the same method as was used on a select group of individual words in my prior patent is used in the present invention, except that certain improvements have been developed in the ten years since filing the earlier patent.

More particularly, it has been learned that severe dyslexics and very young readers are aided by even more assists than previously described. It is an object of the present invention to improve upon the basic method previously patented.

It is a further object of the present invention to provide a reading machine to generate materials for assisting students to read.

BRIEF DESCRIPTION OF THE DRAWINGS

FIG. 1 is an illustration of the display of certain words in augmented form to show the differences from the method described in U.S. Pat. No. 4,007,548.

FIG. 2 is a block diagram showing the elements of the reading enabler.

DESCRIPTION OF PREFERRED EMBODIMENTS

Reading involves two steps: recognizing words and understanding them. Many readers, particularly dyslexics, have difficulty associating sounds with visual symbols. This is especially true with multiple vowel sounds. I am able to help readers by using phonological symbols that are constant regardless of spelling. These symbols are described in my prior patent. Consonants may also be represented by symbols at the very beginning of learning to read.

While nearly all of the symbols of my prior patent are still used, certain new symbols have been found useful. Thus, the hard sound of the letter "g" is sometimes hard to learn. I have found it helpful to use the symbol of a ghost to illustrate the sound. Even the most severe dyslexic and the youngest student can understand the sound from the symbol.

Also, the symbol of a thumb shown in FIG. 1 of my prior patent is not as easily recalled for the "th" sound as is a picture of a person with his tongue extended In all languages, the tongue touching the upper teeth give this sound and it is universally understood.

Another new feature not present in any prior patent is the use of boxes to aide the recognition of syllables within words. While beginning readers may know the sound of letters in isolation, they have difficulty grouping the sounds of letters into syllables or the syllables into words. In FIG. 2 of my prior patent, the word "misinterpretation" was presented with numbers and symbols in augmented form. I have now found that at the very beginning of learning the reading process, or with severe dyslexics, it is desirable to use boxes around the symbols and letters, for each syllable, corresponding to each series of numbers.

Thus, FIG. 1 illustrates how I presently display "Misinterpretation", "wreath" and "grandmother" to beginning students. The underscoring to link letters and the slash to show silent letters are added to the normal type. The numbers which show sequential arrangement of sounds within syllables are added above as well as below to give two separate presentations of the word and numbers. The symbolic version of syllables is highlighted by the use of a box around each syllable.

The entire presentation can be displayed in augmented form either in print form on paper or other medium or displayed on a screen for the student.

As shown in FIG. 2, the present invention makes use of a source material such a newspaper with the words in standard type. To allow the student to read the newspaper, an optical scanner 11 may be placed over the desired print an fed into memory 12. The augmented form desired may be selected from an augmentor 13. If the student is just beginning to learn to read, the enhanced form shown in FIG. 1 with redundant numbers and dual presentation in standard type and box form may by used. If, on the other hand, the student is already reading and wishes only words with which he has difficulty to be displayed in augmented form, the alternative mode may be selected.

In this mode, the standard type is displayed to the student to determine whether it can be read by the student. In the embodiment shown, display 14 is a cathode ray tube, but it can be either the original source material or a print display of the material to be read in standard type.

If the student fails to read a word, two options are available. Either the student or the teacher may request the display of the word in augmented form so that the student may learn the sounds, syllables and sequencing. Alternatively, if not teacher is present the augmentor 13 may be furnished with a voice synthesizer 16 and speaker 17 tied to the display 14. The voice synthesizer giver the command "Say the word" for each particular word in question, then pauses while the student attempts to sound out the word. The voice synthesizer then speaks the correct sounds, syllables and sequencing for each word in question.

I have found that the optical scanner manufactured by Kurzweil Corp. under model number 4000 serves the purpose well in rapidly reading text into memory. This machine is more than an optical scanner. It uses artificial intelligence software to analyze characters. Most reading textbooks can be read into memory in a matter of hours. When used for teaching an adult reader, for example, a book like a craftsman's instruction book may be read into the memory for repeated reading by the adult in augmented form.

The memory can be any one of the many now readily available on the market. A hard disc storage system is best for a large volume of material. A capacity of 16 MB should be available to cover the needs of most beginning readers.

The augmentor can also be any readily available personal computer on the market having speed and capacity. I have found the IBM PC-AT to be suitable. It includes a display and internal memory sufficient for the needs of most students.

The voice synthesizer may conveniently be any commercially available as teaching tools. A suitable voice synthesizer is IBM Voice Communication Option for the IBM PC (IBM Part No. 6294771). This attachment functions as a voice synthesizer and a modem, and can respond to voice commands.

While this invention has been described in detail for the best mode contemplated, it will be understood that other equivalent elements may be used in the system within the scope of this invention.

I claim:

1. A reading machine to enable students to read information from a source of alphanumeric information comprising:
   a memory containing words in augmented form;
   alphanumeric information from the source; data entry means for entering information from scanner into memory;
   an augmentor for adding symbols and numbers in association with the alphanumeric information from the source; and
   display means for presenting the augmented information to students in print or projected form, whereby information from the source is read by the scanner into a memory and augmented with words and symbols for display in an easily readable form.

2. A machine as in claim 1 wherein the source is print medium, including books, magazines or newspapers.

3. A machine as in claim 1 wherein the augmentor is a computer having the capability of retrieving augmented words from storage in the memory and translating plain words from the source into augmented words for display.

4. A machine as in claim 1 wherein the display is paper printed with augmented words by a high speed printer.

5. A machine as in claim 1 wherein the display is a CRT monitor.

6. A machine as in claim 1 wherein the display is a teleprompter.

7. In a method of teaching reading in which the student is presented with material to be read in an orthography consisting of the words to be read in standard type, vowel symbols and numbers for sequencing sounds in syllables, the improvement comprising presenting each word in two presentations, a first presentation with standard type, slash marks to show silent letters and underscoring to show combined letters and numbers above to show sequencing of sounds for each syllable, and a second presentation using capital letters for each consonant not illustrated by a symbol and symbols in place of the letters they represent with a box around each syllable.

* * * * *